US008488144B2

(12) United States Patent  
Fujimori et al.

(10) Patent No.: US 8,488,144 B2  
(45) Date of Patent: Jul. 16, 2013

(54) PRINT JOB MANAGEMENT METHOD AND APPARATUS USING VIRTUAL QUEUES FOR HANDLING PRINT JOBS USING PRE-DEFINED JOB PARAMETERS

(75) Inventors: Toshiro Fujimori, Laguna Beach, CA (US); Geoff W. Harmon, Mission Viejo, CA (US); Rakesh Pandit, Irvine, CA (US); Shigenorl Matsubara, Irvine, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1214 days.

(21) Appl. No.: 11/395,517

(22) Filed: Mar. 31, 2006

(65) Prior Publication Data

US 2007/0229895 A1    Oct. 4, 2007

(51) Int. Cl.
 *G06F 3/12* (2006.01)
(52) U.S. Cl.
 USPC .................................................. 358/1.15
(58) Field of Classification Search
 USPC ................... 358/1.15, 1.13, 1.12, 1.1
 See application file for complete search history.

(56) References Cited

U.S. PATENT DOCUMENTS

| | | | |
|---|---|---|---|
| 5,129,639 A * | 7/1992 | DeHority ..................... | 270/1.01 |
| 5,371,837 A * | 12/1994 | Kimber et al. ............... | 358/1.15 |
| 5,638,497 A * | 6/1997 | Kimber et al. ............... | 358/1.15 |
| 5,903,716 A * | 5/1999 | Kimber et al. ............... | 358/1.13 |
| 6,462,756 B1 * | 10/2002 | Hansen et al. ................ | 715/764 |
| 6,614,549 B1 * | 9/2003 | Hlava ........................... | 358/1.15 |
| 6,823,147 B2 * | 11/2004 | Jackelen et al. .............. | 399/16 |
| 6,930,795 B1 * | 8/2005 | Motamed et al. ............ | 358/1.18 |
| 7,061,633 B1 | 6/2006 | Shima | |
| 7,253,918 B2 | 8/2007 | Nishide et al. | |
| 7,426,046 B2 | 9/2008 | Shirai et al. | |
| 7,634,719 B2 * | 12/2009 | Miura .......................... | 715/224 |

(Continued)

FOREIGN PATENT DOCUMENTS

| | | |
|---|---|---|
| JP | 2000-276313 | 10/2000 |
| JP | 2003-005931 | 1/2003 |
| JP | 2003-044242 | 2/2003 |
| JP | 2005-165773 | 6/2005 |
| JP | 2006-301860 | 11/2006 |

OTHER PUBLICATIONS

Japanese Office Action, dated Aug. 23, 2011, in a counterpart Japanese patent application, No. JP 2007-090243.

*Primary Examiner* — Jeremiah Bryar
(74) *Attorney, Agent, or Firm* — Chen Yoshimura LLP

(57) ABSTRACT

Print management apparatus and method for managing a print shop system are described. A server defines one or more virtual queues as a virtual printing device to which print jobs may be submitted. Each virtual queue designates a physical printer and has a set of pre-defined job parameters (parameters that define how a print job will be printed) associated with it. Each print job managed by the server also has a set of job parameters associated with it to define how the print job is to be printed. When a print job is submitted to a virtual queue for printing, the server overrides the job parameters of the submitted print job, and prints the job on the printer designated by the virtual queue using the job parameters associated with the virtual queue. A warning message may be displayed before the server proceeds with the printing to alert the operator.

6 Claims, 3 Drawing Sheets

U.S. PATENT DOCUMENTS

| | | | |
|---|---|---|---|
| 2003/0053810 A1* | 3/2003 | Jackelen et al. | 399/16 |
| 2004/0047643 A1* | 3/2004 | Jackelen et al. | 399/81 |
| 2004/0190032 A1* | 9/2004 | Ferlitsch | 358/1.13 |
| 2005/0128505 A1* | 6/2005 | Shirai et al. | 358/1.14 |
| 2005/0275852 A1* | 12/2005 | Ferlitsch | 358/1.6 |
| 2010/0027043 A1* | 2/2010 | Kato | 358/1.13 |

* cited by examiner

Fig. 2

PRINT JOB MANAGEMENT METHOD AND APPARATUS USING VIRTUAL QUEUES FOR HANDLING PRINT JOBS USING PRE-DEFINED JOB PARAMETERS

BACKGROUND OF THE INVENTION

1. Field of the Invention

This invention relates to print managing apparatus and method, and more particularly, to print managing apparatus and method that process numerous printing jobs using multiple printers.

2. Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application. Typically, each printing job specifies a source file that electrically contains a document to be printed, the size, color and the type of the paper on which the document should be printed, the printing resolution, duplex or single-side printing, and certain finishing conditions, such as book, staple, collate printing, etc., depending on a print job requester's needs. In order to process a large volume of print jobs that each differ in terms of these job parameters, a print shop utilizes multiple commercial grade printers. Typically, one or more black & white (B&W) printers are in operation to process B&W printing. Color printers are also installed to handle color printing. Each of these printers, however, has limitations on available printer settings, such as the paper size, the paper type, resolution settings, etc.

SUMMARY OF THE INVENTION

The present invention is directed to a print job management apparatus and method that substantially obviates one or more of the problems due to limitations and disadvantages of the related art.

An object of the present invention is to provide an improved print job management apparatus and method.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a print management method implemented in a print shop system for managing print jobs, the print shop system including at least one printer, the method including: (a) defining a virtual queue as a printing device, the virtual queue designating one printer and having a first set of at least one job parameter associated with it; (b) receiving a print job in the virtual queue, the print job having a second set of at least one job parameter associated with it; (c) comparing the first and the second set of job parameters; and (d) displaying a message when at least one job parameter in the first set has a value different from a corresponding job parameter in the second set.

The present invention provides a print management method implemented in a print shop system for managing print jobs, the print shop system including at least one printer, the method including: (a) defining a virtual queue as a printing device, the virtual queue designating one printer and having a first set of at least one job parameter associated with it; (b) receiving a print job in the virtual queue, the print job having a second set of at least one job parameter associated with it; (c) replacing values of the second set of at least one job parameter with corresponding values of the first set of at least one job parameter; and (d) submitting the print job to the printer designated by the virtual queue after replacing the job parameter values.

In another aspect, the present invention provides a computer program product including a computer usable medium having a computer readable code embodied therein for controlling a data processing apparatus, the computer readable program code being configured to cause the data processing apparatus to execute the above process.

It is to be understood that both the foregoing general description and the following detailed description are exemplary and explanatory, and are intended to provide further explanation of the invention as claimed.

BRIEF DESCRIPTION OF THE DRAWINGS

FIG. 2 schematically illustrates a Main Screen that appears on a display panel of a print job management apparatus according to an embodiment of the present invention.

DETAILED DESCRIPTION OF THE PREFERRED EMBODIMENTS

Figure 1:
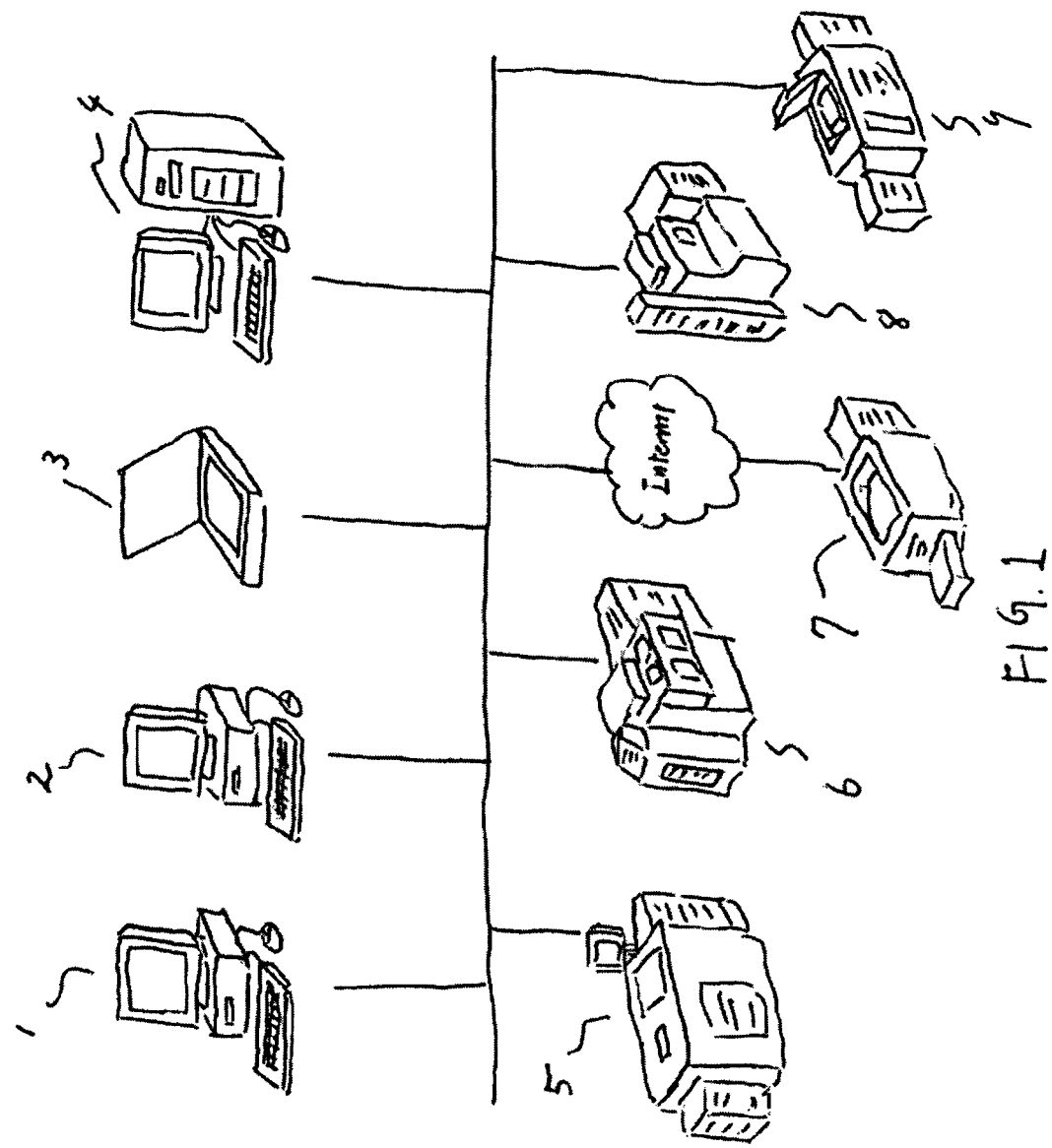
FIG. 1 schematically illustrates a print management system having multiple printers.

According to embodiments of the present invention, a large number of print jobs can be speedily and efficiently processed. FIG. 1 illustrates an example of a print shop having multiple printers in which a print management system according to embodiments of the present invention may be implemented. Client computers 1 and 2 are connected to a server 4 via a local area network (LAN). Scanner 3 is also connected to server 4 via the LAN. In this example, B&W printers 5, 6, and 7 and color printers 8 and 9 are connected to the server through the LAN.

In this example, printers 5-9 are commercial standard high-end printers that can handle high speed, high quality printing. Each of the printers 5-9 has multiple paper trays to store paper of various sizes, color, and types. Further, some of the printers 5-9 are equipped with a sophisticated output sorting mechanism with multiple output trays to perform collate printing or other print finishing functions. Each printer has one or more display monitors to display the status of the printing and various warning and instruction messages to a user. Each printer is equipped with its own central processing unit (CPU) and appropriate hardware/software to control its own printing operations, and communicates with server 4 via a LAN. Some of these printers may also be multifunction printers that can perform copying and scanning of documents. Appropriate server software is installed in server 4 to perform various standard network administrative functions.

In addition to the server administrative software, print job management software is installed on a hard disk drive in the server 4 for managing a large number of print jobs that come into a print shop. Once a print shop operator calls the print job management software, server 4 reads out the print job management software to a random access memory (RAM) of the server to carry out various function of the software, including management of print jobs.

A print job is a print request specifying various desired options (job parameters) together with a document to be printed. For example, a customer may bring a floppy diskette containing a file in the PDF format for printing with a particular finishing option. The print shop operator asks the customer what kind of print jobs is desired to figure out print job parameters. Alternatively, the customer may be asked to fill out a questionnaire sheet to describe what print options he/she desires. For example, the customer may desire that the document be printed on 24 lb 25% cotton letter size paper in full color in the double-sided printing mode in the amount of 100 copies. The print shop operator then records these job parameter values along with customer information as a file and store the file and the source PDF file onto the hard disk drive or other secured storage device so that the print job parameters are associated with the file.

Print jobs also may be generated by a customer's requests to copy a document. When a customer brings a document for copying, the shop operator scans the document using scanner 3 (which may be a color and/or B&W scanner) and converts the document into a digital file and thereafter creates a data file associated with the scanned source document in a manner similar to the method described above.

Theses data files representing print jobs and associated files are forwarded to server 4. This way, numerous print jobs are generated and collected by server 4 on which print job management software is running.

The print job management server 4 running print job management software receives the print job files and analyzes and processes the print jobs. The print job management software preferably is designed to run on Windows OS, Macintosh OS, or Unix X Windows or other popular computer operating systems implementing a GUI (graphic user interface), such as a touchscreen and/or a mouse and a keyboard, coupled with a display monitor. Server 4 (or any suitable data processing apparatus) running print job management software is hereinafter referred to as "print job management server." In this application, the terms "print job management server" and "print job management apparatus" broadly refer to any data processing apparatus that can implement various features of embodiments of the present invention described below with appropriate hardware/software.

Figure 2:
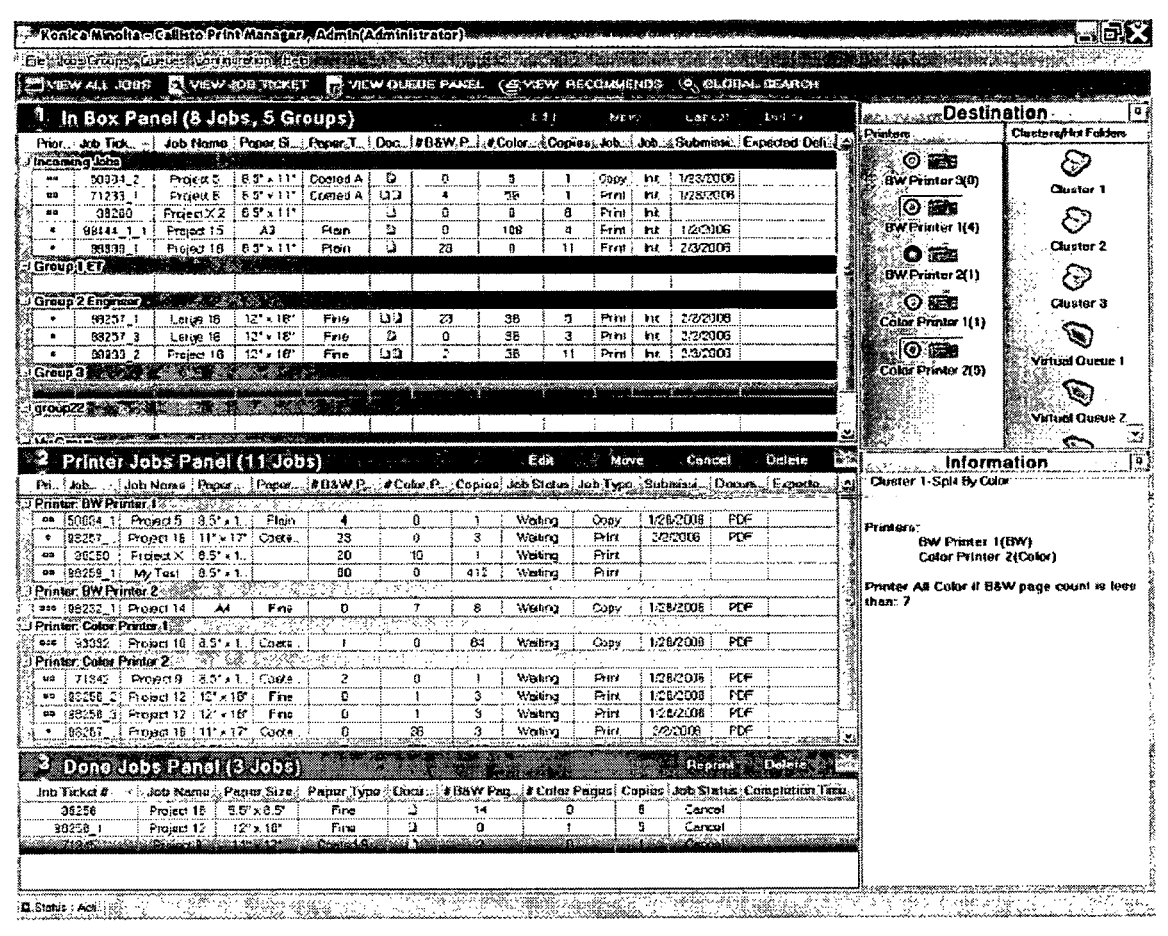

The print job management server 4 presents GUI having a main screen shown in FIG. 2 on a monitor of the server 4 (or on a monitor of client computer 1 or 2 or on a monitor of any one of the printers 5-9 when remote access to the print job management software is possible at the client computer or the printer). An In Box Panel contains all new incoming print jobs sent to the print job management server 4 under the header of "Incoming Jobs." One row in the In Box Panel contains one print job. Print jobs listed in the "Incoming Jobs" in the In Box Panel have not yet been assigned to a printer(s). The Job Ticket Number column lists job numbers assigned to respective print jobs. Values of selected job parameters, such as Paper Size, Paper Type, Document Color, Job Types, the number of copies/prints, etc. are also indicated in the In Box Panel. A Printer Jobs Panel displays active jobs in all the printers monitored by the print job management server 4. A Completed Jobs Panel displays completed or cancelled print jobs.

The main screen of the GUI also has a Destination Panel indicating icons representing printing devices (also referred to as print destinations) connected to the print shop system for printing print jobs. The print destinations include printers, clusters and virtual queues. The operator can drag and drop a print job from the In Box Panel, Printer Jobs Panel and Completed Jobs Panel to one of the print destination icons displayed in the Destination Panel. The result is that the print job management server forwards the print job to the selected printing device so that the designated printer, cluster or virtual queue starts processing the printing operation. As a result, the print job entry in the In Box Panel moves to the Printer Jobs Panel. Once the print job is completed, the job entry moves from the Printer Jobs Panel to the Completed Jobs Panel.

Additional features of the GUI are described in commonly owned, co-pending U.S. patent application entitled "Print Job Management Method and Apparatus with Grouping Function"11/394,526. These additional features do not form a part of the present invention, but their descriptions may provide a more comprehensive understanding of the environment in which the present invention may be employed.

Of the printing devices displayed in the Destination Panel, printers are actual physical printers that are connected to the server. Clusters and virtual queues are software-defined virtual printing devices to which individual print jobs can be submitted for performing designated printing operations. A cluster corresponds to a combination of two or more physical printers with a preset or user-defined rule or algorithm for processing the print job. When a print job is submitted to a cluster, the print job is split into two or more jobs based on the rule or algorithm, and the split jobs are processed by the two or more printers in the cluster.

A virtual queue is a virtual printing device that designates one physical printer and has a set of pre-defined job parameters associated with it. When a print job is submitted to a virtual queue, the job will be printed on the designated printer according to the set of job parameters associated with the virtual queue. Since a print job submitted to the virtual queue already has its own set of job parameters, the virtual queue will override any original job parameter values of a print job that do not match the values of corresponding job parameters of the virtual queue. For example, a virtual queue may specify a particular B&W printer and an input tray using letter size 18 lb plain paper. Thus, when a print job designating color printing on A4 size 24 lb paper is sent to this virtual queue, the print job management server replaces the original job parameter values of the print job with the job parameter values of the virtual queue. As a result, the B&W printer prints out greyscale images on letter-size 18 lb paper.

Thus, a virtual queue is different from a printer as a print destination in how the job parameters are handled. If a print job is submitted to a printer as a print destination, the printing will be done using the job parameter settings associated with the submitted job. If the job parameters of the submitted print job do not match the device characteristics of the printer (e.g. the job parameter requires A4 size paper but the printer only has letter size paper in the input tray), the printer will wait, and will start printing after paper with the correct size has been supplied to the input tray. In a virtual queue, the submitted job will be printed with modified job parameters—the job parameters associated with the virtual queue will be used, which have been set to match the device characteristics of the printer. The virtual queue feature is useful, for example, when the characteristics of an actual printer do not match the requirements of a print job, but the user desires a quick review of the document and can accept a different paper size or paper quality.

Preferably, when a print job is submitted to a virtual queue, the server displays a warning message if the job parameters associated with the submitted print job are not identical to the pre-defined job parameters of the virtual queue; i.e., at least one of the job parameter of the submitted print job has a value different from the corresponding job parameter of the virtual queue. The warning message preferably indicates which job parameters are not identical. The operator may then choose to stop, in which case the print job will not be printed; or to proceed with printing the job, in which case the job is printed with the job parameters of the virtual queue. Using the warning message can help avoid operator mistakes, e.g., mistakes caused by inadvertently dropping a job in the virtual queue icon or by the operator's lack of understanding of the original job parameters of the print job. Preferably, the operator is allowed to choose whether warning messages will be displayed, so that a well-trained and experienced operator can bypass the warning messages.

Alternatively, the server may provide an "original job priority" mode, in addition to the "virtual queue priority" mode described above. In the original job priority mode, the server will not override the original job parameters when they fail to match the job parameters of the virtual queue; rather, the server will submit the print job with its original job parameters to the printer designated by the virtual queue. However, since the job parameters for the virtual queue have been pre-set to match the device characteristics of the designated physical printer, using the original job priority mode will cause the printer to wait, for example, for the operator to change the input paper size. In this respect the original job priority mode is similar to using a printer as a print destination. The original job priority may be implemented by displaying a warning message as described above, and presenting the operator with the choices to stop, to proceed with printing in the virtual queue priority mode (i.e. overriding the job parameters of the print job), and to proceed with printing in the original job priority mode (i.e. not overriding the job parameters of the print job).

Preferably, when a plurality of virtual queues are set up and available through the Destination Panel, the server is able to display the pre-defined job parameters associated with each virtual queue as well as the job parameters for a job to be submitted to a virtual queue. The job parameters are displayed at the operator's request, for example, when the operator clicks on a job and the virtual queue list. This display will allow the operator to determine the virtual queue that best suits the print job to be submitted. Alternatively or in addition, the server may automatically determine the virtual queue that best suits the print job to be submitted. Any suitable algorithm may be used for making such a determination. For example, the server may choose the virtual queue that satisfies the highest number of job parameters of the print job. Alternatively, the server may assign different weights to the job parameters when evaluating the overall match of the two sets of job parameters.

Virtual queues may be created and their parameters specified by users to suit the users' needs. This may be accomplished using the graphic user interface, such as by using a dialog box. Default or sample virtual queues may also be provided as a part of the print job management software for convenience. In addition, double clicking a virtual queue icon in the Destination Panel allow the user to review the properties of the virtual queue. The implementation of the above editing features is within the capabilities of those skilled in the programming art.

Figure 3:
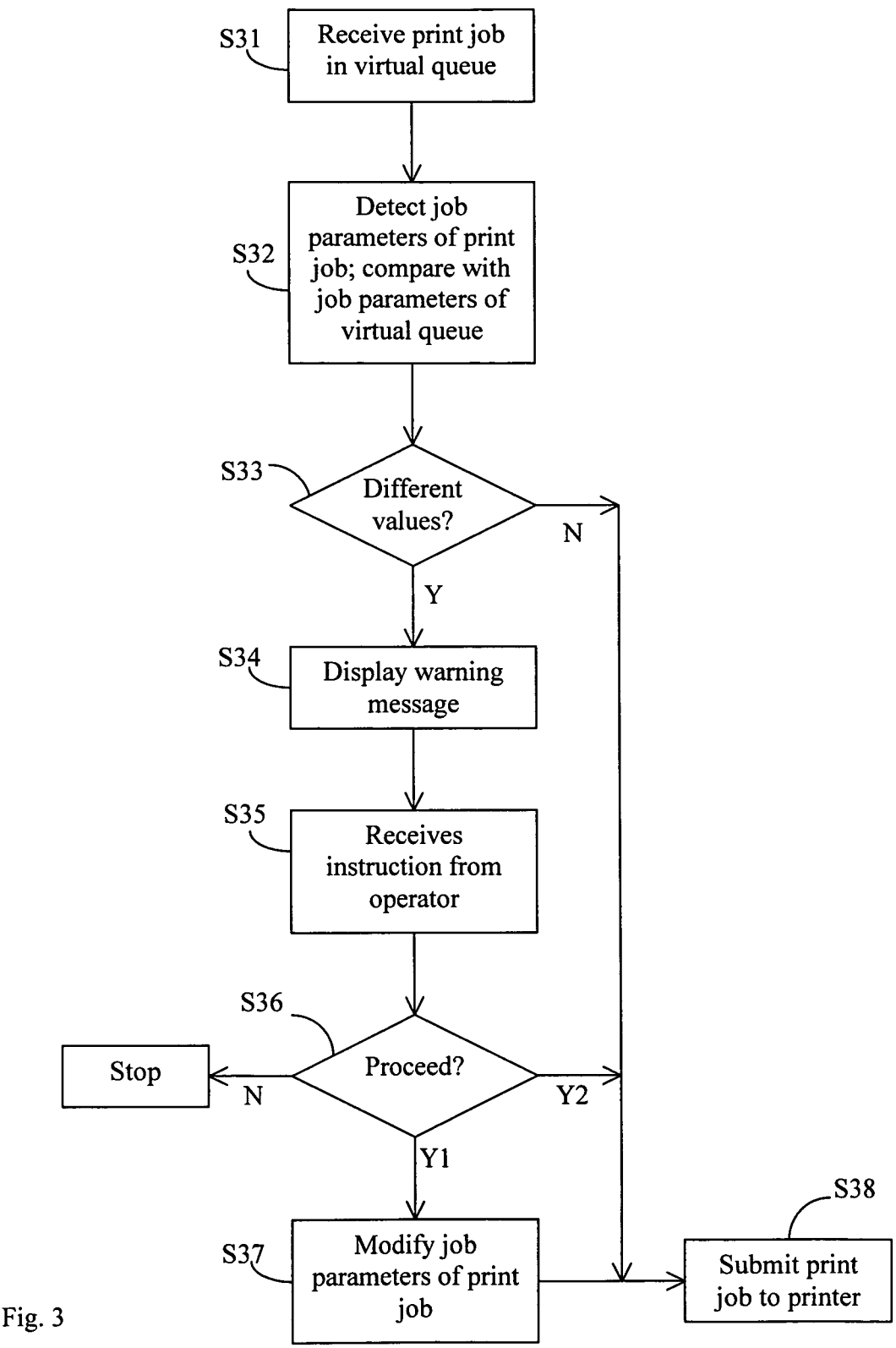
FIG. 3 illustrates a print management method according to an embodiment of the present invention.

FIG. 3 is illustrates a method for managing print jobs using virtual queues. When a print job is received in a virtual queue (step S31), the server detects the job parameters associated with the received print job, and compares them to the job parameters pre-defined for the virtual queue (step S32). If any difference between the values of the two sets of job parameters is detected ("Y" in step S33), the server displays a warning message to the operator, identifying the job parameters that have different values (step S34). The server receives an instruction from the operator indicating whether or how to proceed with the printing (step S35). The process ends if the instruction is not to proceed ("N" in step S36). If the instruction is to proceed in the virtual queue priority mode ("Y1" in step S36), the server modifies the print job by replacing the values of the job parameters with those of the corresponding pre-defined parameters of the virtual queue (step S37). In actual operation, this can be done by copying all job parameters from the virtual queue to the print job, or copying only the parameters that are different. The server then submits the modified print job to the printer designated by the virtual queue which prints the job (step S38). If the instruction received in step S35 is to proceed in the original job priority mode ("Y2" in step S36), the server submits the print job to the printer (step S38) without modifying the job parameters. In the comparison step S32, if no difference between the values of the job parameters of the received print job and the virtual queue is detected ("N" in step S33), then the server submits the print job to the printer (step S38) without modifying the job parameters. It is noted here that not all steps shown in FIG. 3 are required for particular embodiments of the present invention. For example, steps S34, S35 and S36 are optional (i.e., the warning message display may be bypassed); or step S36 may allow only two choices (to stop or to proceed and override the original job parameters).

Although certain graphic user interface (GUI) features are described above in describing the operation of the virtual queue, the invention is not limited to specific GUI features.

While the embodiments have been described as being applied in a print shop environment, the invention is not limited to any physical setting of a shop or network, and can be applied to a print shop system having a distributed setting where printers at different locations are connected to a server. Further, although a Windows based server computer with appropriate software has been described above as an example, a print management system of the present invention can be implemented in a proprietary hardware system that is specifically designed to perform the above-described various functionalities of the print management system.

It will be apparent to those skilled in the art that various modification and variations can be made in the print job management method and apparatus of the present invention without departing from the spirit or scope of the invention. Thus, it is intended that the present invention cover modifications and variations that come within the scope of the appended claims and their equivalents.

What is claimed is:

1. A method implemented in a print job management apparatus for managing print jobs, the print job management apparatus being connected to a plurality of printers each having its characteristics, the method comprising:

defining a plurality of virtual queues as a plurality of printing devices, each of the plurality of virtual queues designating one of the plurality of printers and having a first set of job parameters associated with the virtual queue, the first set of job parameters matching the characteristics of the designated printer;

displaying, in a user interface display, a plurality of print destinations including the plurality of printers and the plurality of virtual queues;

processing a first print job, including:

receiving the first print job, the first print job having a second set of job parameters associated with it;

comparing the second set of job parameters associated with the received first print job with the plurality of first sets of job parameters associated with the virtual queues to select one of the plurality of virtual queues based on the comparison;

replacing values of the second set of job parameters associated with the first print job with corresponding values of the first set of job parameters associated with the selected virtual queue; and submitting the first print job to the printer designated by the selected virtual queue after replacing the job parameter values; and processing a second print job, including:

receiving the second print job to be printed by a selected one of the plurality of printers, the second print job having a third set of at least one job parameters associated with it; and submitting the second print job to the selected printer with the third set of job parameters without replacing any of the third set of job parameter values, regardless of whether the third set of job parameters match the characteristics of the selected printer.

2. The method of claim 1, wherein the comparing step selects one of the plurality of virtual queues that satisfies the highest number of the second set of job parameters associated with the received first print job.

3. The method of claim 1, wherein the comparing step includes assigning different weights to the job parameters of the second set of job parameters associated with the received first print job, evaluating a match of the second set of job parameters with each of the first sets of job parameters using the assigned weights, and selecting one of the plurality of virtual queues based on the evaluation.

4. A computer program product comprising a computer usable non-transitory medium having a computer readable code embodied therein for controlling a print job management apparatus, the print job management apparatus being connected to a plurality of printers each having its characteristics, the computer readable program code configured to cause the print job management apparatus to execute a process for managing print jobs, the process comprising the steps of:

defining a plurality of virtual queues as a plurality of printing devices, each of the plurality of virtual queues designating one of the plurality of printers and having a first set of job parameters associated with the virtual queue, the first set of job parameters matching the characteristics of the designated printer;

displaying, in a user interface display, a plurality of print destinations including the plurality of printers and the plurality of virtual queues;

processing a first print job, including:

receiving the first print job, the first print job having a second set of job parameters associated with it;

comparing the second set of job parameters associated with the received first print job with the plurality of first sets of job parameters associated with the virtual queues to select one of the plurality of virtual queues based on the comparison;

replacing values of the second set of job parameters associated with the first print job with corresponding values of the first set of job parameters associated with the selected virtual queue; and submitting the first print job to the printer designated by the selected virtual queue after replacing the job parameter values; and processing a second print job, including:

receiving the second print job to be printed by a selected one of the plurality of printers, the second print job having a third set of at least one job parameters associated with it; and submitting the second print job to the selected printer with the third set of job parameters without replacing any of the third set of job parameter values, regardless of whether the third set of job parameters match the characteristics of the selected printer.

5. The computer program product of claim 4, wherein the comparing step selects one of the plurality of virtual queues that satisfies the highest number of the second set of job parameters associated with the received first print job.

6. The computer program product of claim 4, wherein the comparing step includes assigning different weights to the job parameters of the second set of job parameters associated with the received first print job, evaluating a match of the second set of job parameters with each of the first sets of job parameters using the assigned weights, and selecting one of the plurality of virtual queues based on the evaluation.

* * * * *